United States Patent
Dillon

(10) Patent No.: US 10,146,836 B2
(45) Date of Patent: Dec. 4, 2018

(54) PRIMARY KEY GENERATOR

(71) Applicant: Dillon Software Services, LLC, Parker, CO (US)

(72) Inventor: David M. Dillon, Parker, CO (US)

(73) Assignee: Dillon Software Services, LLC, Parker, CO (US)

( * ) Notice: Subject to any disclaimer, the term of this patent is extended or adjusted under 35 U.S.C. 154(b) by 749 days.

(21) Appl. No.: 14/713,129

(22) Filed: May 15, 2015

(65) Prior Publication Data

US 2015/0331884 A1 Nov. 19, 2015

Related U.S. Application Data

(60) Provisional application No. 61/994,184, filed on May 16, 2014.

(51) Int. Cl.
*G06F 17/30* (2006.01)

(52) U.S. Cl.
CPC .. *G06F 17/30492* (2013.01); *G06F 17/30138* (2013.01); *G06F 17/30227* (2013.01)

(58) Field of Classification Search
None
See application file for complete search history.

(56) References Cited

U.S. PATENT DOCUMENTS

| | | | |
|---|---|---|---|
| 2003/0014335 A1* | 1/2003 | Lecheler-Moore | G06Q 30/02 705/30 |
| 2007/0276833 A1* | 11/2007 | Sen | G06F 17/30312 |
| 2010/0205223 A1* | 8/2010 | Millington | H04H 20/40 707/803 |
| 2013/0060811 A1* | 3/2013 | Dircks | G06Q 10/10 707/770 |
| 2014/0006293 A1* | 1/2014 | Chang | G06Q 30/016 705/304 |
| 2015/0269207 A1* | 9/2015 | Deng | H04L 61/2038 707/696 |

OTHER PUBLICATIONS

SQLite Autoincrement (https://web.archive.org/web/20130508105851/https://sqlite.org/autoinc.html) May 8, 2013. 2 pages.*
Schwartz, Baron. "How to find missing values in a sequence with SQL". Dec. 6, 2005. 10 pages.*
Lasham, Stephen. "Finding Gaps in a Sequential Number Sequence". SQL ServerCentral, 2006 (Year: 2006).*
"Do Salesforce ID's Ever Get Reused." Salesforce Developer Community. 2 pgs.

(Continued)

*Primary Examiner* — Alicia M Willoughby
(74) *Attorney, Agent, or Firm* — Hamilton, DeSanctis & Cha LLP

(57) ABSTRACT

Systems and methods for reclaiming and reusing primary key values are provided. According to one embodiment, multiple unused primary key values of a database application are reclaimed by a key generator by locating a gap in a sequence of a primary key column of the database application. Reuse of the reclaimed unused primary key values is facilitated by the key generator by returning a reclaimed unused primary key value responsive to a request from the database system for a new primary key value for the primary key column.

20 Claims, 8 Drawing Sheets

(56) References Cited

OTHER PUBLICATIONS

Larsson, P. "Efficiently Reuse Gaps in an Identity Column." SQL Team. Feb. 9, 2010. 6 pgs.
3.6.9 Using Auto_Increment. MySQL 5.1 Reference Manual. 7 pgs.
Purimetla. B. et al., "Real-Time Databases: Issues and Applications1." Department of Computer Science. 22 pgs.
"Reuse an Identity Field Value After Deleting Rows." 1.12M Developers and IT Professionals Learning and Sharing Knowledge. MS SQL. 3 pgs.
"Using the Graph to Control Unique id Generation." Neo4j GraphGist. 5 pgs.
"[Resolved] sync/re-order post id's? (3 posts)." Forums. WordPress Support. 2 pgs.

\* cited by examiner

PRIMARY KEY GENERATOR

CROSS-REFERENCE TO RELATED APPLICATIONS

This application claims the benefit of priority to U.S. Provisional Application No. 61/994,184, filed on May 16, 2014, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2014-2015 Dillon Software Services, LLC.

BACKGROUND

Field

Embodiments of the present invention generally relate to database applications. More specifically, embodiments of the present invention relate to reclamation and reuse of primary key values.

Description of Related Art

There are types of database applications in which an event causes a large number of records to be inserted and deleted over a short period of time, while the net increase in the number of records is relatively small and negligible.

For example, an Online Transaction Processing (OLTP) application may provide a means for a user to submit an arbitrary number of input data to a program with a request to analyze the submitted data and update and store results data based on the analysis. Any previous results data must be discarded (deleted), and new results data must be preserved (inserted). In this example over a period of 5 seconds, 5000 records are inserted, and 5000 records are deleted, and the net increase is (0). If this is a multi-user application and users are submitting data every 60 seconds, then on average the application is inserting and deleting 83 records per second.

It is common practice to store records in tables that have an integer based primary key column that has a unique constraint enabled, are indexed, and automatically provide unique values on insert using an auto increment algorithm; that is, for each insert, the database system assigns a value that is (1) plus the value assigned on the previous insert.

The auto increment algorithm advances the values by (1) indefinitely. Database designs that utilize auto increment must anticipate the maximum number of inserts that will occur over the life of the database, and size the capacity of the primary key column to avoid overflow.

In the example above, if the primary column uses a 4-byte integer, its capacity is 2,147,483,647. At 83 inserts per second, the auto increment algorithm would overflow in approximately 298 days. The lifespan of most database applications is measured in years so a 4-byte integer does not provide sufficient capacity. Using an 8-byte integer, the capacity is 9,223,372,036,854,775,807 and overflow would occur in approximately 3,509,654,504 years.

It is common to use 8-byte integer primary keys to avoid the problem of overflow, but its use adversely impacts the performance of any database application and consumes more RAM of the database computer.

SUMMARY

Systems and methods are described for reclaiming and reusing primary key values. According to one embodiment, multiple unused primary key values of a database application are reclaimed by a key generator by locating a gap in a sequence of a primary key column of the database application. Reuse of the reclaimed unused primary key values is facilitated by the key generator by returning a reclaimed unused primary key value responsive to a request from the database system for a new primary key value for the primary key column.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
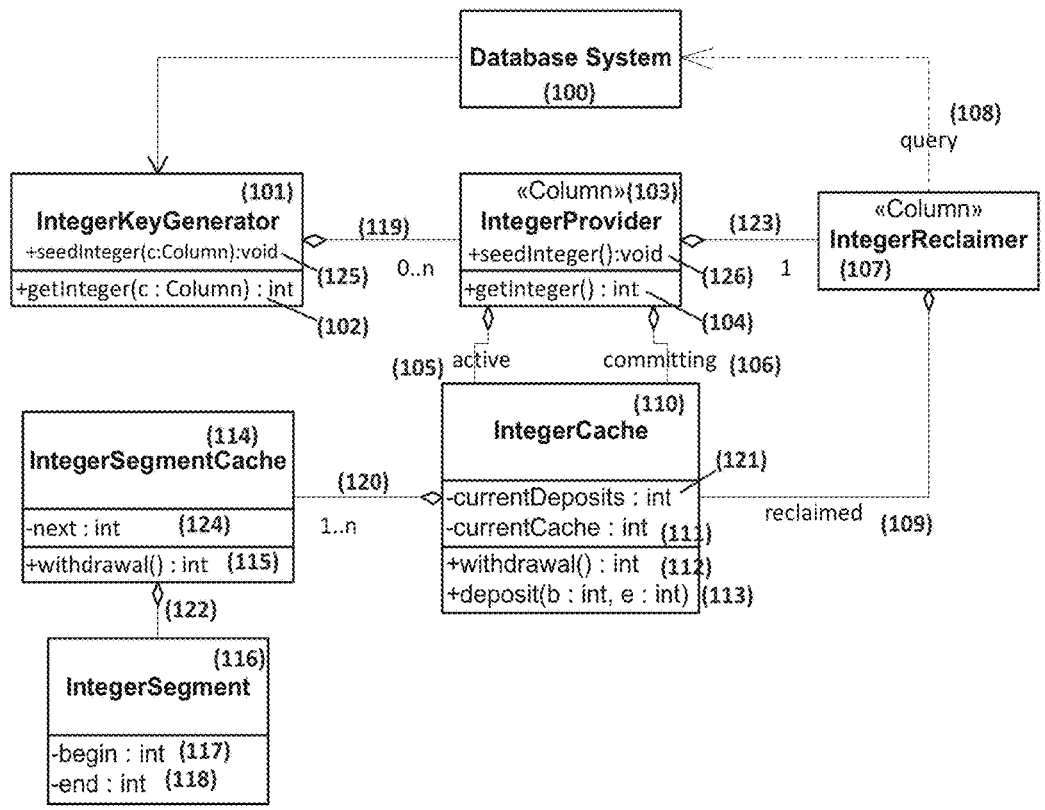
FIG. 1 is a Unified Modeling Language (UML) class diagram illustrating various classes of a primary key generator system or service in accordance with an embodiment of the present invention.

Systems and methods are described for reclaiming and reusing primary key values. Using embodiments of the present invention, rather than resorting to larger and less memory efficient primary keys (e.g., 8-byte primary keys), a database application can be designed using smaller and more memory efficient primary keys (e.g., 4-byte primary keys) without concern of reaching overflow. Furthermore, embodiments of the present invention mitigate a common form of database fragmentation referred to as internal fragmentation, which requires monitoring and periodic maintenance. Embodiments of the present invention, provide an alternative to existing auto increment algorithms for issuing primary key values on insert and instead reclaim and reuse primary key values. Exemplary database applications in which embodiments of the present invention are thought to be particularly well suited include those in which it is preferable to have a relatively small memory footprint and/or avoid internal database fragmentation. Applications having such requirements include, but are not limited to, mobile devices, embedded controllers and telemetry systems and multi-user online transaction processing (OLTP) web applications.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

While embodiments of the present invention are described with reference to integer-based primary key values, those skilled in the art will appreciate that the methods described herein are broadly applicable to any form of primary key that can be sorted and that is sequential.

For sake of brevity embodiments of the present invention are described with reference to a primary key reclamation process that is performed responsive to a request for a primary key that results in use of the last available primary key value in an active cache. It is to be noted, however, that various alternatives are available. For example, in one embodiment, the database system/application may report deleted primary keys to the key generation system or the key generation system may hook database deletion activity and store the deleted primary key values in a list of available key values. Alternatively, the reclamation process may be performed on a periodic basis by a background process.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed there between, while not sharing any physical connection on with another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

Static Description

FIG. 1 is a Unified Modeling Language (UML) class diagram illustrating various classes of a primary key generator system or service in accordance with an embodiment of the present invention. In the context of the present example, Database System 100 represents a system or service that is solely responsible for assigning primary key values when new records are inserted into a database; where corresponding to the values, the primary key column typically has a unique value constraint enabled and is indexed. Database system 100 may be a Relational Database System (RDBS) or an intermediate service between the client application and the RDBS. In the context of the present example, it is assumed that the service is solely responsible for assigning primary key values when new records are inserted into a database. Database System 100 obtains primary key values from a IntegerKeyGenerator (101).

IntegerKeyGenerator 101 provides integer primary key values to Database System (100); and includes:
  A collection 119 of unique key/value pairs where the keys correspond to a primary column within a table and the values correspond to an instance of IntegerProvider 103 that provides primary key values for a specific column.
  A method 102 to get an integer value for a given column.

A method 125 to seed an IntegerProvider, corresponding to a given column.

IntegerProvider 103 is a class the provides primary key values for a specific column within a table; and includes:

A reference 105 to an "active" IntegerCache 110 that IntegerProvider 103 is currently using as the source of integer values for its column.

A reference 106 to a "committing" IntegerCache 110 that IntegerProvider 103 was using as the active cache, just prior to using the current active cache.

A reference 123 to an IntegerReclaimer 107; the element that queries 108 the records in Database System 100 and reclaims primary key values.

A method 104 to provide an integer value for use as a primary key value.

A method 126 to seed, or initiate the reclamation process.

IntegerReclaimer 107 is a class that is used to query 108 a column corresponding to a primary key in a table, searching for available integer values that may be used as primary key values; and includes:

A reference 109 to the "reclaimed" IntegerCache 110 that IntegerReclaimer 107 uses to retain primary key values that are available for use.

A reference 105 to the "active" IntegerCache 110 that IntegerProvider 103 is referencing. In one embodiment, IntegerReclaimer 107 avoids reclaiming keys referenced by the active 105 cache.

A reference 106 to the "committing" IntegerCache 110 that the IntegerProvider 103 is referencing. In one embodiment, IntegerReclaimer 107 avoids reclaiming keys referenced by the committing 106 cache.

IntegerCache 110 is a class that provides integer values from non-contiguous sets of integer segments; and includes:

A reference 120 to an ordered list (collection) of IntegerSegmentCache(s) 114

A count of available integers 121 that are currently deposited in the collection of IntegerSegmentCache(s) 114.

An index 111 referencing the position of the IntegerSegmentCache 114 that is currently providing integer values.

A method to withdraw 112 the next integer, from the current IntegerSegmentCache 114; if the current segment cache is empty, the next segment cache in the collection is used; when all the segment caches in the collection are empty, IntegerCache 110 is empty.

IntegerSegmentCache 114 is a class that provides sequential integer values from a contiguous set of integers; and has:

A reference 122 to an IntegerSegment 116 representing the begin and end of a contiguous set of integers.

A field 124, "next", representing the next integer value that can be withdrawn from the IntegerSegmentCache 114.

A method 115 to withdraw the next integer; when "next" 124 advances beyond the end of IntegerSegment 116, IntegerSegmentCache 114 is empty.

IntegerSegment 116 is a class that represents a contiguous set of integers; and includes:

A field 117, "begin", representing the inclusive start of a contiguous set of integers.

A field 118, "end", representing the inclusive end of a contiguous set of integers.

Notes on Static Description

While the examples described herein utilize integer primary keys, it will be appreciated by those skilled in the art that primary key values and the methodologies described herein can be applied to any size or type of value so long as there is a rule for ordering values in sequence.

IntegerKeyGenerator could include an application programming interface (API) to allow Database System to return integer values back to IntegerKeyGenerator directly. If Database System is aware of the values that are being deleted, it could notify IntegerKeyGenerator, and thus improve reclamation performance by reducing the number of queries.

Providing an Integer Value to the Database System

A client application inserts a record into the database by invoking an appropriate Application Program Interface (API) on the Database System (100). The Database System processes the request and determines a need to assign a primary key integer value corresponding to the primary key column of record.

Figure 2:
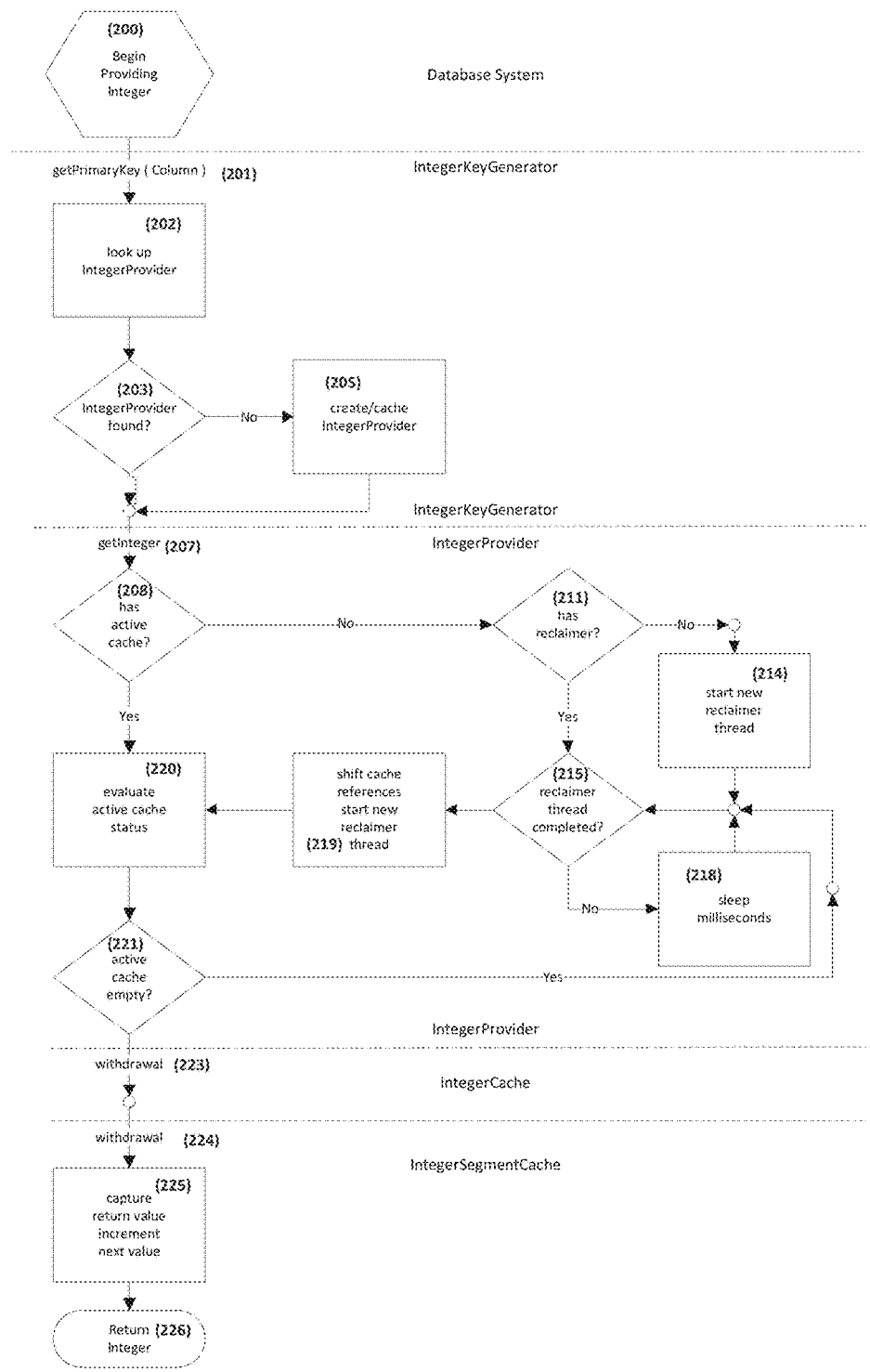
FIG. 2 is a flow diagram illustrating an integer providing process in accordance with an embodiment of the present invention.

FIG. 2 is a flow diagram illustrating an integer providing process in accordance with an embodiment of the present invention. At block 200, the Database System invokes getPrimaryKey 201 on IntegerKeyGenerator, providing a reference to the column. IntegerKeyGenerator uses the column reference to lookup, at block 202, and reference a corresponding IntegerProvider. At decision block 203, it is determined whether an IntegerProvider is found. If not, then processing continues with block 204 and a new instance of IntegerProvider is created and cached at block 205; otherwise, an IntegerProvider was found and processing continues at 206.

At 206, IntegerKeyGenerator has a reference to the IntegerProvider corresponding to the column and IntegerKeyGenerator invokes getInteger 207 on IntegerProvider.

At decision block 208, it is determined whether IntegerProvider has initialized its active IntegerCache. If not, processing branches to decision block 211; otherwise, processing continues with block 220.

At decision block 211, it is determined whether IntegerProvider has initialized its IntegerReclaimer. If not, processing branches to block 214 where a new IntegerReclaimer is started in a new thread. An example, of starting a new IntegerReclaimer is discussed further below with reference to FIG. 4. Otherwise, if IntegerProvider has initialized its IntegerReclaimer, then processing continues with decision block 215.

At decision block 215, it is determined whether the reclamation process has completed. If not, then IntegerProvider thread sleeps for a number of milliseconds at block 218 before returning to decision block 215 to again check on the status of the reclamation process. When the reclamation process has completed, then processing continues with block 219 at which point IntegerProvider shifts the IntegerCache references and a new IntegerReclaimer is started in a new thread.

At block 219, the active IntegerCache becomes the committing IntegerCache, the completed IntegerReclaimer's IntegerCache becomes the active IntegerCache, and the new IntegerReclaimer thread begins to manifest a new internal IntegerCache.

At block 220, the status of the active IntegerCache is evaluated. An example of this processing is described and illustrated with reference to FIG. 3. At decision block 221, it is determined whether the active IntegerCache is empty. If so, then processing branches to decision block 215 to check the status of the IntegerReclaimer process; otherwise, processing continues to 223 to withdraw an integer from the active IntegerCache.

At 223, IntegerProvider invokes withdrawal on the active IntegerCache; and in turn at 224 IntegerCache invokes withdrawal on its current IntegerSegmentCache. At block 225, IntegerSegmentCache captures its current integer value as the return value, advances its next attribute by one (1); and returns the integer value at 226 (according to the call stack) to the Database System.

Notes on Providing Integer Value to Database System

Typically, the IntegerReclaimer thread is complete well before the active IntegerCache is exhausted, so the shift is instantaneous.

Embodiments of the present invention provide for both a committing and active IntegerCache. It is common for a single database transaction to include multiple insert statements on the same table. It is therefore common that for a transaction, IntegerProvider will initially provide integer values out of a "first" IntegerCache and undergo a shift and then provide integer values of a "second" IntegerCache. Embodiments of the present invention make no assumptions about when the integer values are committed to the database, so to avoid reclaiming integer values that have not yet been committed embodiments of the present invention avoid reclaiming values from the "first" (committing) IntegerCache and the "second" (active) IntegerCache.

IntegerKeyGenerator, IntegerProvider and IntegerReclaimer and their processes can be distributed remotely, but for the sake of performance it is recommended they reside within the same process memory space.

Evaluate IntegerCache Status

Evaluating IntegerCache status is used by IntegerProvider to determine if its active IntegerCache is empty, and has the side effect of preparing the IntegerCache to provide the next integer value if it is not empty.

Figure 3:
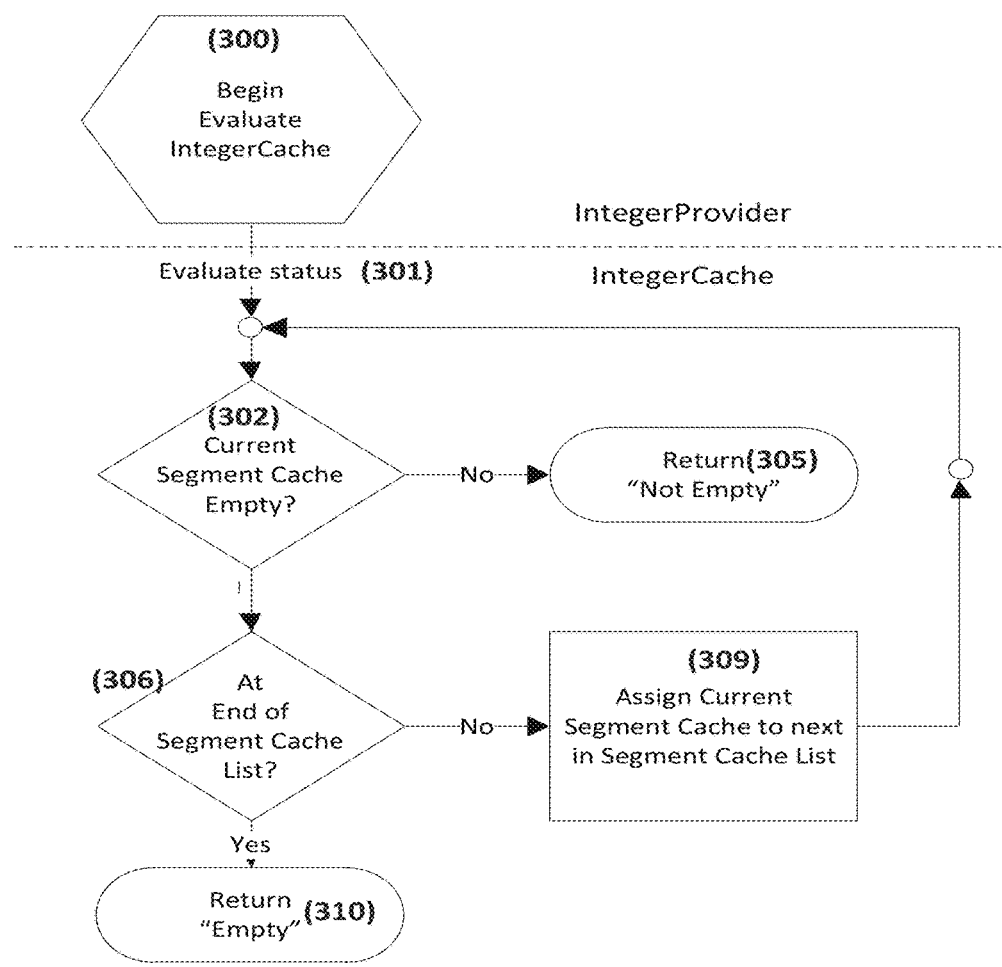
FIG. 3 is a flow diagram illustrating an integer cache evaluation process in accordance with an embodiment of the present invention.

FIG. 3 is a flow diagram illustrating an integer cache evaluation process in accordance with an embodiment of the present invention. Evaluation begins at block 300. At 301, IntegerProvider queries IntegerCache for status.

At decision block 302, the status of the segment cache is determined. If the IntegerCache's current IntegerSegmentCache is not empty, then processing branches to block 305 at which "not empty" status is returned to IntegerProvider; otherwise, if the current IntegerSegmentCache is empty, then processing continues with decision block 306.

At decision block 306, it is determined whether a next IntegerSegmentCache is available or whether the end of the segment cache has been reached. If a next IntegerSegmentCache is available in the IntegerCache's collection, then processing branches to block 309 where the next IntegerSegmentCache in the collection becomes the current IntegerSegmentCache and evaluation loops back to decision block 302; otherwise, the end of the segment cache has been reached and, at block 310, "empty" status is returned to IntegerProvider.

Start New IntegerReclaimer Thread

Reclaiming integer values for use as primary key values is a process of identifying a series of integer values (corresponding to a collection of IntegerSegment(s)) that do not intersect the series of integer values corresponding to the union of: (i) all integer values persisted in the database table, and (ii) all integer values corresponding to the IntegerProvider's active and committing IntegerCache.

Depending upon the particular implementation, reclamation is typically performed in its own thread of execution, separate from the rest of the Application, so that when IntegerProvider needs to shift the reclaimed IntegerCache to its active IntegerCache, the reclamation process is most likely complete and the shift is instantaneous.

Figure 4:
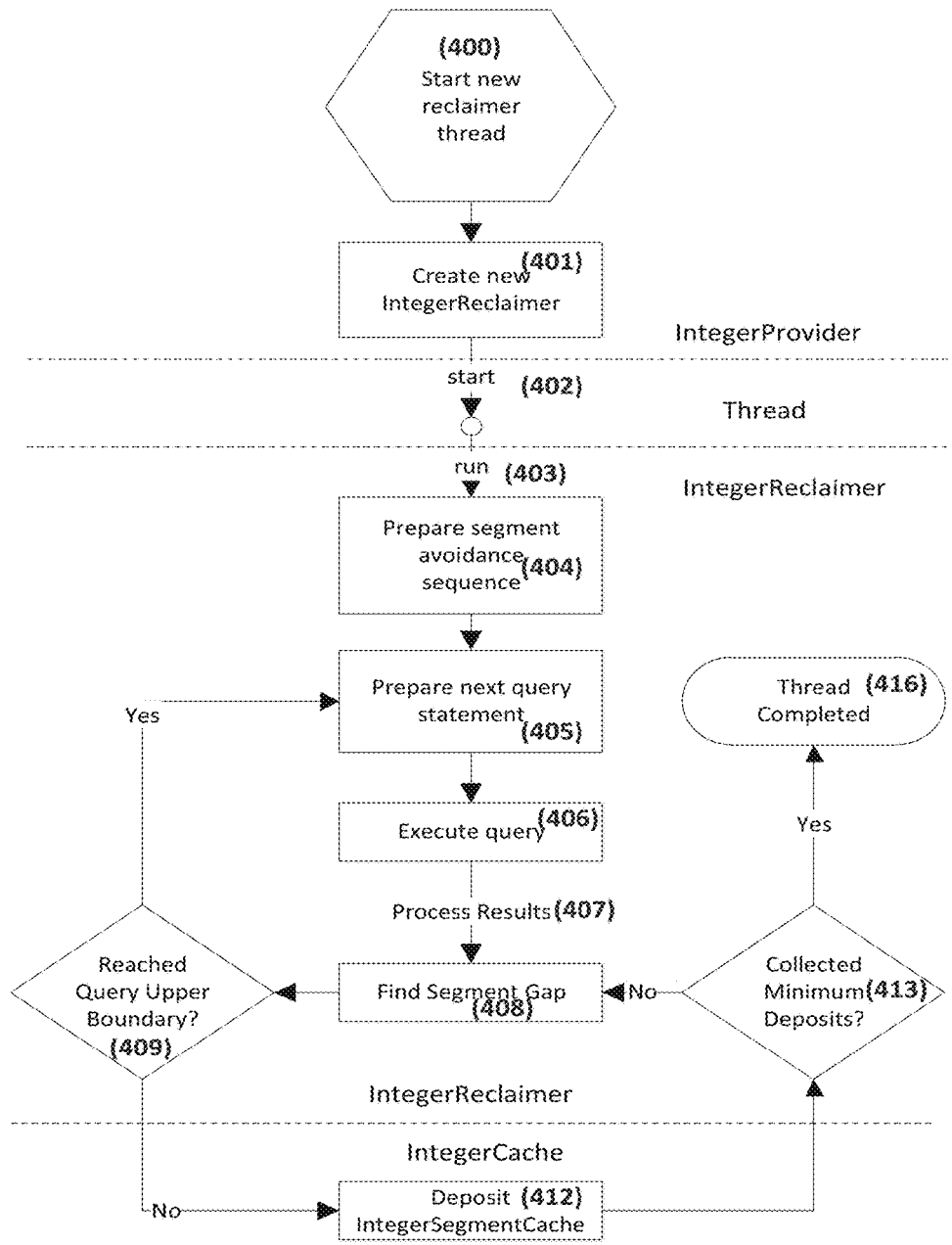
FIG. 4 is a flow diagram illustrating processing of a reclaimer thread in accordance with an embodiment of the present invention.

FIG. 4 is a flow diagram illustrating reclaimer thread processing in accordance with an embodiment of the present invention. Reclamation begins at block 400. At block 410, IntegerProvider creates a new instance of IntegerReclaimer, providing a reference to the active and committing IntegerCaches. Once created, IntegerProvider starts a thread 402, which in turn invokes the run method 403 on IntegerReclaimer.

At block 404, IntegerReclaimer creates a collection of IntegerSegments to avoid, which is constructed from the union of all IntegerSegments associated with the active and committing IntegerCaches, combined to represent an ordered sequence of discrete contiguous integer segments that do not overlap.

Block 405 is a point in a loop that prepares database queries on the primary key column, where for any given iteration of the loop, the query contains conditions to: (i) limit the maximum size of the result set and (ii) prevents querying regions that would intersect any of the IntegerSegments to avoid constructed at block 404, (iii) orders the results according to the primary key column, in ascending order.

Nominally, the loop begins by setting a query region with lower and upper bounds, where the lower bound is set to some minimum integer value and the upper bound set to a maximum value that limits the size of the results set; and on each successive loop, advances in sequence to the next region by incrementing the lower and upper bounds by the maximum limit, subject to the segments to be avoided. The loop continues until a sufficient number of integer values have been reclaimed.

Continuing with block 405, a database query is prepared, and at block 406 the query is executed, and before entering block 408, the result set is processed.

Block 408 is a point in a loop that is used to find discontinuities in the sequence of integer values of the result set. Each break in continuity found in the result set represents an available IntegerSegment that can be reclaimed. Recall that the query has a lower and upper boundary and that the results are ordered by the primary column in ascending order. If each record in the result set is treated as having a position in an array, then by comparing the integer value of a record to its position in the array, discontinuities can be identified.

Continuing with block 408, the next break in continuity is found. At decision block 409, it is determined whether the break corresponds to the query upper boundary. If so, then processing loops back to block 405 to prepare the next query; otherwise, processing continues with block 412 where IntegerReclaimer deposits an IntegerSegmentCache, corresponding to the break in continuity, into the reclaimed IntegerCache.

At decision block 413, if it is determined that the total number of integer values reclaimed is less than the minimum required deposits, then processing continues with block 408 to find the next break in continuity; otherwise, the reclamation process completes at block 416 and the IntegerReclaimer thread ends.

Notes on Start New IntegerReclaimer Thread

At decision block 413, the minimum number of deposits depends on the Application, and is greater than the maximum number of inserts that may occur during any single database transaction.

Limiting the maximum size of the result set is done to avoid long database queries and to minimize the demand on RAM to process the results set. Using multiple, fast queries also provides opportunity for the Application to invoke the Database System while reclamation is occurring.

While embodiments of the present invention are described in the context of the non-intersection of a given series and: persisted values and active and committing IntegerCaches, those skilled in the art will appreciate the applicability of the invention to the non-intersection of a given series: and persisted values and any number of IntegerCaches.

While embodiments of the present invention are described in the context of querying the database in a way that avoids querying regions corresponding to the active and committing caches, those skilled in the art will appreciate that other methods are possible, including querying all regions in the database and then taking into account the active and committing caches on the query results.

Seeding an IntegerProvider

Seeding an IntegerProvider is done for situations where, for a given column, the reclamation process takes several seconds or more to complete, and it is important to have reclaimed integer values soon after a client Application is first started (booted up). Seeding an IntegerProvider can be initiated by virtually any entity, including the Database System or a client Application.

Figure 5:
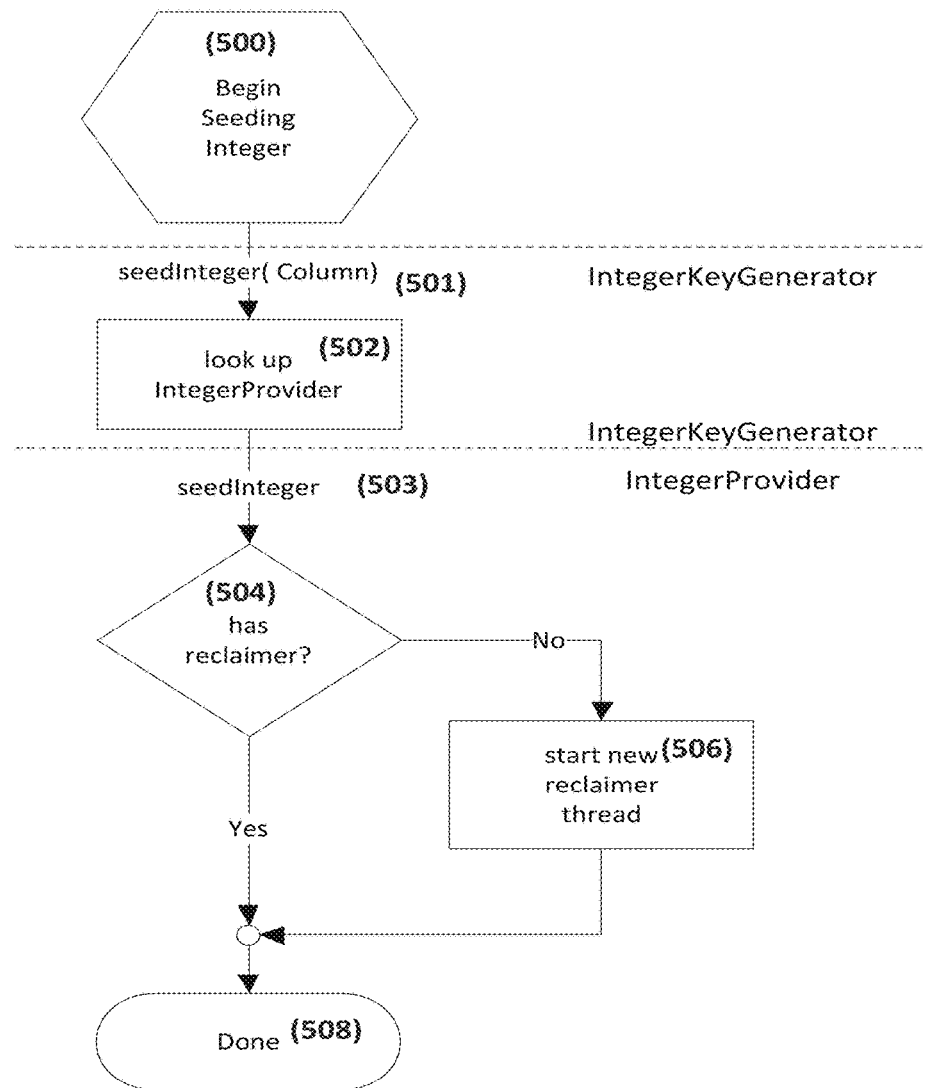
FIG. 5 is a flow diagram illustrating an integer seeding process in accordance with an embodiment of the present invention.

FIG. 5 is a flow diagram illustrating an integer seeding process in accordance with an embodiment of the present invention. An entity 500 invokes the seedInteger 501 method on IntegerKeyGenerator, providing a reference to the column. At block 502, IntegerKeyGenerator establishes a reference to the IntegerProvider, and then invokes the seedInteger 503 method on IntegerProvider.

At decision block 504, it is determined whether IntegerProvider has already initialized its IntegerReclaimer. If so, then the process ends at block 508; otherwise, a new IntegerReclaimer is started at block 506 in a new thread and the process ends at block 508.

Exemplary Computer System Overview

Figure 6:
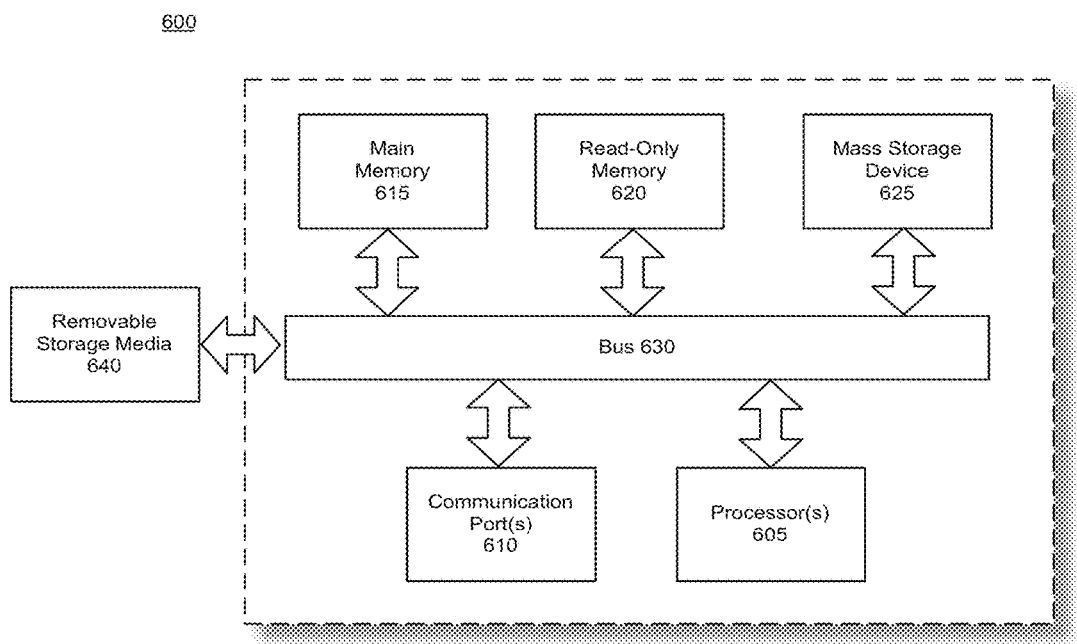
FIG. 6 is an example of a computer system with which embodiments of the present invention may be utilized.

FIG. 6 is an example of a computer system 600 with which embodiments of the present invention may be utilized. Computer system 600 may represent or form a part of a server or a client workstation, for example.

Embodiments of the present invention include various steps, which will be described in more detail in the attached Appendices. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors or other future processors.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Components described above are meant only to exemplify various possibilities. In no way should the aforementioned exemplary computer system limit the scope of the present disclosure.

Figure 7:
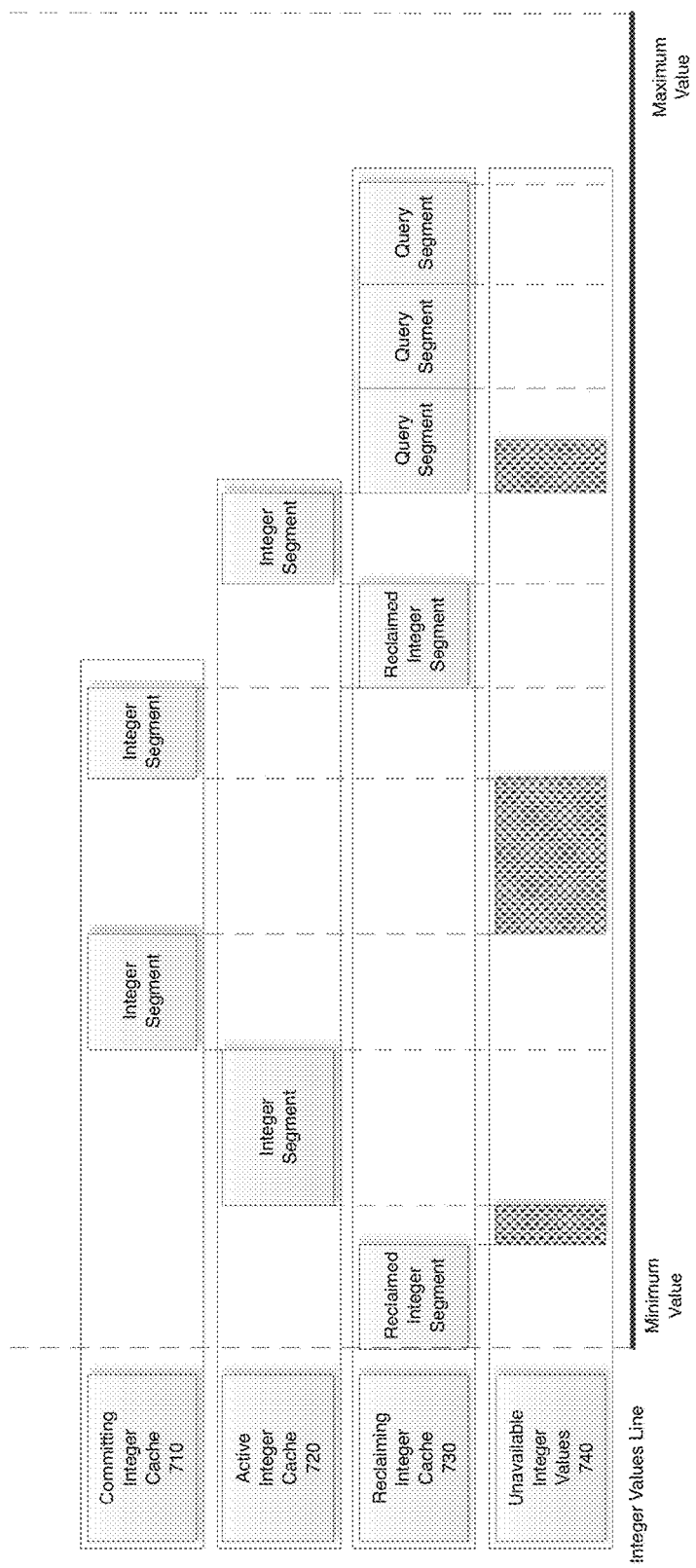
FIG. 7 conceptually illustrates various caches that may be used to track reclaimed primary key values in accordance with an embodiment of the present invention.

FIG. 7 conceptually illustrates various caches that may be used to track reclaimed primary key values in accordance with an embodiment of the present invention. In the context of the present example, a key generation system (which may be part of or separate from a database system or application), uses three data structures, i.e., a committing integer cache 710, an active integer cache 720 and a reclaiming integer cache 730, as part of the primary key reclamation and reuse process.

Those primary keys that are currently in use by the database system/application for a particular primary key column are represented by the cross-hatched portions of unavailable integer values 740.

Reclaiming integer cache 730 contains primary key values for a particular table/column of the database system/application that have been identified by the key generation system as unused and have been reclaimed, but which have not yet been made available for reuse.

Active integer cache 740 contains primary key values for a particular table/column of the database system/application from which requests from the database system/application are served. According to one embodiment, each primary key value in active integer cache 740 is associated with a status value indicating whether the primary key value is currently available for reuse by the database system/application or whether the primary key value has already been provided to the database system/application for reuse. When all of the primary key values in active integer cache 740 have been reused, active integer cache 740 is considered "empty" (however, those of ordinary skill in the art will appreciate this does not mean there is no data present—simply that all of the primary key values contained therein have been marked as reused).

Committing integer cache 710 contains primary key values that have previously been provided to the database system/application for reuse. As described further below with reference to FIG. 8, in one embodiment, a primary key reclamation process is performed responsive to active integer cache 740 becoming empty.

In alternative embodiments, in which deleted primary keys are reported to or otherwise gathered by the key generation system responsive to database deletion activity, for example, active integer cache 270 and reclaiming integer cache 730 may be combined into a single cache from which the reclaimed primary keys can be provided to the database system/application for reuse.

Figure 8:
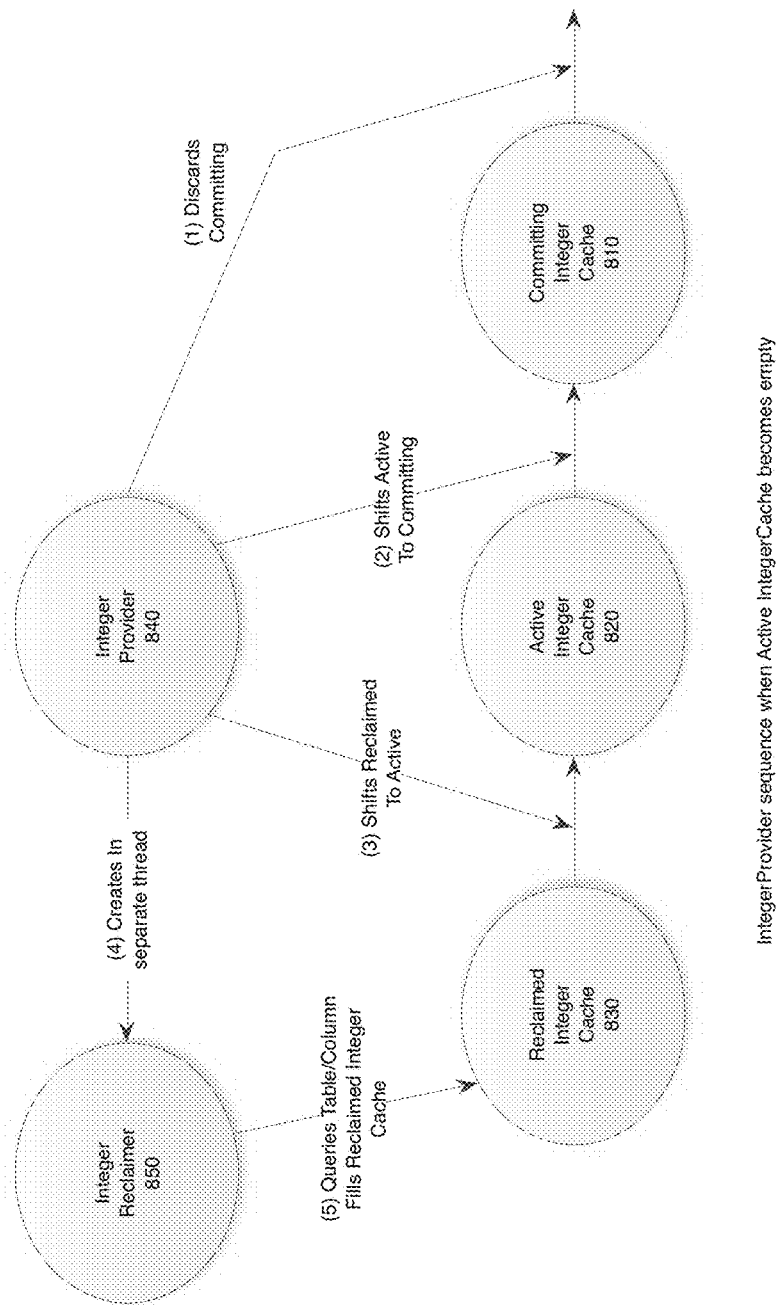
FIG. 8 conceptually illustrates processing relating to various caches when the active cache becomes empty in accordance with an embodiment of the present invention.

FIG. 8 conceptually illustrates processing relating to various caches when the active cache becomes empty in accordance with an embodiment of the present invention. In the context of the present example, it is assumed that an integer provider process 840 has been requested to provide an available primary key (one that has previously been reclaimed) from an active integer cache 820. It is further assumed that, as a result of providing the available primary key, active integer cache 820 has become empty (e.g., all primary key values within active integer cache 820 have been used). In response to determining that active integer cache 820 is empty, integer provider 840 discards a committing integer cache 810, replacing it with active integer cache 820 and replaces active integer cache 820 with a reclaimed integer cache 830. Integer provider 840 further creates an integer reclaimer 840 in a separate thread, which queries the database system/application table/column at issue to refill reclaimed integer cache 830.

What is claimed is:

1. A method comprising:
   reclaiming, by a key generator running on a computer system, a plurality of unused primary key values of a database application by locating a gap in a sequence of a primary key column of the database application by linearly searching one or more portions of the sequence;
   facilitating reuse of one or more reclaimed unused primary key values of the plurality of reclaimed unused primary key values, by the key generator, by returning one of the plurality of reclaimed unused primary key values responsive to a request from the database application for a new primary key value for the primary key column;
   maintaining, by the key generator, a set of caches including:
       a committing cache containing information regarding those of the plurality of unused primary key values that have been previously provided to the database application by the key generator for reuse by the database application;
       an active cache containing information regarding those of the plurality of unused primary key values and their corresponding status indicating whether the unused primary key value is currently available for reuse by the database application or whether the unused primary key value has already been provided to the database application for reuse; and
       a reclaimed cache containing information regarding those of the plurality of unused primary key values that are not yet available for reuse by the database application;
   wherein said returning one of the plurality of reclaimed unused primary key values comprises returning a primary key value of the plurality of unused primary key values from the active cache; and
   responsive to said returning a primary key value of the plurality of unused primary key values from the active cache resulting in the active cache being empty:
       discarding, by the key generator, the committing cache;
       replacing, by the key generator, the committing cache with the active cache;
       replacing, by the key generator, the active cache with the reclaimed cache; and
       refilling the reclaimed cache by storing, by the key generator, by identifying a new set of unused primary key values that are no longer being used within the primary key column by performing said reclaiming and storing the new set of unused primary key values within the reclaimed cache.

2. The method of claim 1, wherein the key generator is solely responsible for generating primary key values for the database application.

3. The method of claim 1, wherein the primary key column has a unique value constraint enabled.

4. The method of claim 1, wherein the primary key column includes values that can be sorted and are sequential.

5. The method of claim 4, wherein the values are integer values.

6. The method of claim 5, wherein the integer values comprise 4-byte integer values.

7. The method of claim 1, wherein the key generator is integrated within the database application.

8. The method of claim 1, wherein the key generator is implemented separately from the database application.

9. The method of claim 1, wherein the database application is implemented within one of more of a mobile device, an embedded controller, a telemetry system and a multi-user online transaction processing (OLTP) web application.

10. A method comprising:
    maintaining, by a key generator system running on a computer system, a set of caches to facilitate reuse of reclaimed primary key values for one or more primary key columns of a database system, wherein the set of caches include:
    a committing cache containing information regarding a plurality of reclaimed primary key values that have been previously provided to the database system by the key generator system for reuse by the database system;
    an active cache containing information regarding a plurality of reclaimed primary key values and their corresponding status indicating whether the reclaimed primary key value is currently available for reuse by the database system or whether the reclaimed primary key value has already been provided to the database system for reuse; and
    a reclaimed cache containing information regarding a plurality of reclaimed primary key values that are not yet available for reuse by the database system;

receiving, by the key generator system from the database system, a request for a primary key value for a primary key column of the database system;
responsive to the request, returning, by the key generator system, a primary key value of the plurality of the reclaimed primary key values from the active cache; and
when said returning results in the active cache being empty, then:
discarding, by the key generation system, the committing cache;
replacing, by the key generation system, the committing cache with the active cache;
replacing, by the key generation system, the active cache with the reclaimed cache;
identifying a plurality of primary key values that are no longer being used within the primary key column, by a reclaimer thread of the key generator system, issuing one or more queries against the database system and locating a gap in a sequence of the primary key column; and
refilling the reclaimed cache by causing to be stored, by the reclaimer thread, the identified plurality of primary key values within the reclaimed cache.

11. The method of claim 10, wherein the key generator system is solely responsible for generating primary key values for the database system.

12. The method of claim 10, wherein the primary key column has a unique value constraint enabled.

13. The method of claim 10, wherein the primary key column includes values that can be sorted and are sequential.

14. The method of claim 13, wherein the values are integer values.

15. The method of claim 14, wherein the integer values comprise 4-byte integer values.

16. The method of claim 10, wherein the key generator system is integrated within the database system.

17. The method of claim 10, wherein the key generator system is implemented separately from the database system.

18. A non-transitory computer-readable storage medium embodying a set of instructions, which when executed by one or more processors of one or more computer systems, causes the one or more processors to perform a method comprising:
reclaiming, by a key generator, a plurality of unused primary key values of a database application by locating a gap in a sequence of a primary key column of the database application by linearly searching one or more portions of the sequence;
facilitating reuse of one or more reclaimed unused primary key values of the plurality of reclaimed unused primary key values, by the key generator, by returning one of the plurality of reclaimed unused primary key values responsive to a request from the database application for a new primary key value for the primary key column;
maintaining, by the key generator, a set of caches including:
a committing cache containing information regarding those of the plurality of unused primary key values that have been previously provided to the database application by the key generator for reuse by the database application;
an active cache containing information regarding those of the plurality of unused primary key values and their corresponding status indicating whether the unused primary key value is currently available for reuse by the database application or whether the unused primary key value has already been provided to the database application for reuse; and
a reclaimed cache containing information regarding those of the plurality of unused primary key values that are not yet available for reuse by the database application;
wherein said returning one of the plurality of reclaimed unused primary key values comprises returning a primary key value of the plurality of unused primary key values from the active cache; and
responsive to said returning a primary key value of the plurality of unused primary key values from the active cache resulting in the active cache being empty:
discarding, by the key generator, the committing cache;
replacing, by the key generator, the committing cache with the active cache;
replacing, by the key generator, the active cache with the reclaimed cache; and
refilling the reclaimed cache by storing, by the key generator, by identifying a new set of unused primary key values that are no longer being used within the primary key column by performing said reclaiming and storing the new set of unused primary key values within the reclaimed cache.

19. The non-transitory computer-readable storage medium of claim 18, wherein the key generator is integrated within the database application.

20. The non-transitory computer-readable storage medium of claim 18, wherein the key generator is implemented separately from the database application.

* * * * *